D. B. Randall,
Shutter Fastener.

N° 50,775.      Patented Oct. 31, 1865.

Witnesses
Frederick Curtis
G. H. Washburn

Inventor
Daniel B. Randall
By his Attorney
R. H. Eddy

UNITED STATES PATENT OFFICE.

DANIEL B. RANDALL, OF AUGUSTA, ASSIGNOR TO HIMSELF AND SAML. W. RUSSELL, OF EAST POLAND, MAINE.

BLIND-FASTENER.

Specification forming part of Letters Patent No. 50,775, dated October 31, 1865.

*To all whom it may concern:*

Be it known that I, DANIEL B. RANDALL, of Augusta, in the county of Kennebec and State of Maine, have invented an Improved Blind-Fastener; and I do hereby declare the same to be fully described in the following specification and represented in the accompanying drawings, of which—

Figure 1:
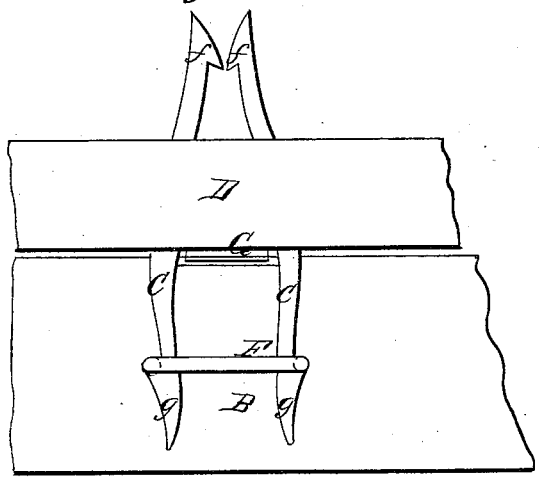
Figure 3:
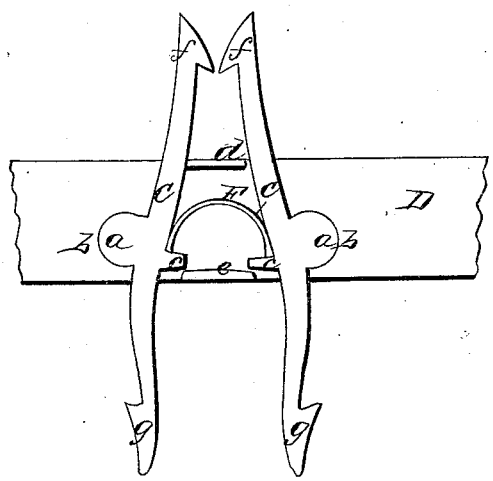
Figure 2:
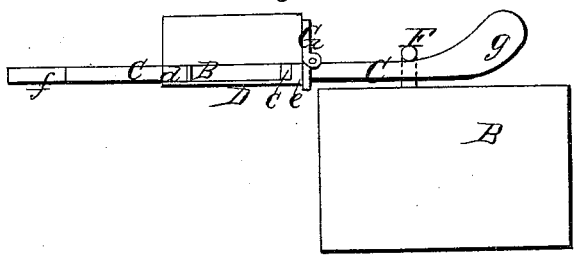

Figure 1 is a representation of such blind-fastener as applied to the lower bars of a blind and a window-frame. Fig. 2 is a longitudinal section of the same. Fig. 3 is a view of the catch-levers, their spring and case.

The fastener to which my invention appertains consists in part of two lever-catches, C C, formed and arranged as represented in the drawings, and being placed within and so as to project in opposite directions from a case, D. Each lever has fulcrum-projections $a\ c$ extending from it. It also has a catch, $f$, at the extremity of one arm, and a catch, $g$, at the extremity of its other arm, the whole being as shown in the drawings. The projections $a\ c$ operate with a recess $b$, and bear on projections $d\ e$, applied to the case or arranged as shown in Fig. 3.

The said case D, when in use, is to be screwed or fastened to the under side of the lower bar of a blind, in order that the two catches $g\ g$ when the blind is closed may be in engagement with a staple, F, driven vertically into the window-sill B. When the blind is opened to its full extent the outer catches, $f\ f$, are to take upon a device duly formed to engage them, it being projected from the side of the building in which the window may be.

A bow-spring, E, arranged in the case and between the levers C C in manner as represented, serves to press the levers apart from each other.

In order to prevent the levers C C from being operated on by a person when without the house and when the blind is closed, I combine with them and apply to the blind a device, G, which may be in the form of a common butt-hinge, one leaf being secured to the blind so as to enable the other, as occasion may require, to be turned down between the inner arms of the two levers, so that when between them it may extend from one to the other of them and prevent the levers from being moved toward each other.

By the mode of making the levers and the case, viz., with the projections $a\ a\ c\ c\ d\ e$ and the recesses $b\ b$ arranged as described and represented, I am enabled to dispense with separate fulcra for and holes through the levers and their case. I am also enabled to use a bow-spring for the levers, and to support it to good advantage.

What I claim as my invention is—

1. The arrangement of the projections $a\ a\ c\ c\ d\ e$ and the recesses $b\ b$ with the levers C C and their case D, the same being as described.

2. The combination and arrangement of the hinge or device G or its mechanical equivalent with the blind and the two catch-levers C C, applied thereto as explained.

D. B. RANDALL.

Witnesses:
H. S. HARDY,
A. A. TRAFTON.